Sept. 16, 1958     T. L. BEACH, JR     2,851,926

MIRROR

Filed April 16, 1956     2 Sheets-Sheet 1

INVENTOR.
THEODORE L. BEACH JR.
BY Toulmin & Toulmin
ATTORNEYS

Sept. 16, 1958     T. L. BEACH, JR     2,851,926
MIRROR
Filed April 16, 1956     2 Sheets-Sheet 2
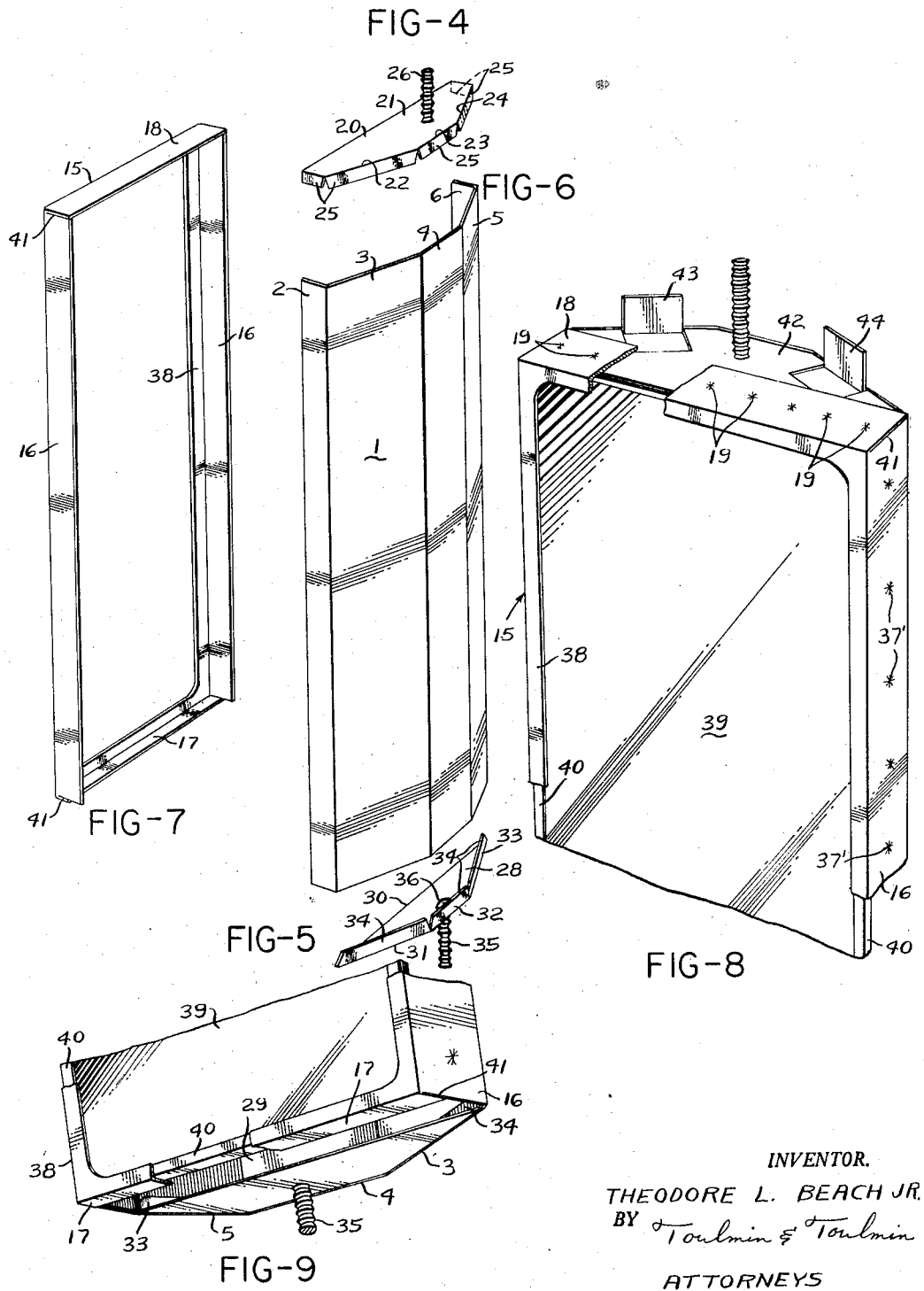
INVENTOR.
THEODORE L. BEACH JR.
BY Toulmin & Toulmin
ATTORNEYS

United States Patent Office 2,851,926
Patented Sept. 16, 1958

2,851,926

MIRROR

Theodore L. Beach, Jr., New Carlisle, Ohio

Application April 16, 1956, Serial No. 578,401

5 Claims. (Cl. 88—98)

My present invention relates to mirror mounts and is particularly concerned with rear view mirrors for motor vehicles such as trucks and busses although principles thereof are also applicable to bath-room mirrors, for example.

A primary object of the invention is the provision of a mirror mount which is adapted to rigidly back a mirror against the effects of vibration, such as is encountered in motor vehicle usage, while yet providing for ready replacement of the glass of the mirror.

It is a particular object of the invention to provide a resiliently mounted mirror wherein the cooperating components are few in number, readily assembled, securely support the glass of the mirror and yet are adapted to retain the mirror glass releasably.

An important object of the invention is to provide in combination with a backing novel mirror glass retaining means which resiliently support the glass at all times without the inclusion of rubber components or similar molded compositions.

It is a principal object of the invention to provide a mirror mounting structure which does not "steam up" or become fogged even under adverse conditions as in bathroom mirror usage, and which similarly does not become fogged in vehicle usage.

The invention will be more fully understood by reference to the following detailed description and accompanying drawings wherein:

Figure 4 illustrates one end panel of the structure of invention;

Figure 5 illustrates the other end panel of the structure of invention;

Figure 6 illustrates the trough-shaped backing member of the mirror mount of Figure 1;

Figure 7 illustrates a mirror-retaining frame which cooperates with the structure of Figure 6 to define an open-front compartment;

Figure 8 is a fragmentary view illustrating a further modification in the structure of invention; and Figure 9 is a fragmentary perspective view of the lower end portion of the structure of Figure 1.

Figure 3:
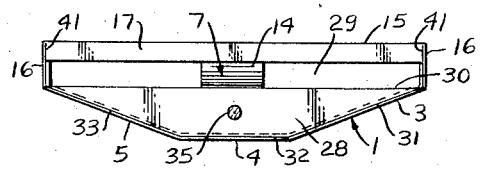
Figure 3 is an end view taken substantially on line 3—3 of Figure 1.

Referring to the drawings, the numeral 1 indicates an elongated backing which is generally trough-shaped having, as shown in Figure 3, five sides denoted at 2, 3, 4, 5 and 6. The lateral sides 2, 6 extend at substantially right angles to the central side 4, while the intermediate sides 3, 5 taper to join the laterals with the center.

Loosely secured in the trough-shaped backing intermediate the length thereof and supported on the central side 4 is a mirror-support indicated generally at 7. This mirror-support comprises a longitudinally extending resilient band of metal 8. Intermediate its ends the band 8 is flat and conforms closely to the backing side 4. Straps 9, 10 spaced just inwardly of the extreme ends of the intermediate portion 11 pass across the portion and are spot welded to the backing on either side of the intermediate portion as shown at 12. The straps as they pass over the intermediate portion are raised thereabove and the band is limitedly movable longitudinally and laterally of the backing.

At the ends of the intermediate portion 11 the band is arched upwardly free of the base forming spring arms 13, 14. These arms are depressible or deflective under an applied pressure, the arms tending to straighten out. The resilience of the spring arms insures of their return to normal position when an applied biasing pressure toward the backing is removed. Further the arms are deflective very slightly due to the spacing between the straps and the central portion of the band.

A mirror-retaining frame 15 is provided at 16 with a peripheral flange which engages with and is spot welded to the lateral sides 2, 6 of the trough-shaped backing 1. The frame flange-end 17 is cut-out for a purpose to be described hereinafter and the opposite frame flange-end 18 is spot welded as at 19 to an end-filler panel of sheet metal 20 shown more clearly in Figure 4.

Panel 20 comprises a long side 21 which extends across the width of the backing and short sides 22, 23, 24 which conform in contour respectively to backing sides 3, 4 and 5. The panel 20 also comprises a plurality of integral downturned tabs as shown at 25, which tabs resiliently engage inner surface portions of the backing. Through the panel extends a screw 26 provided on its inner end with a nut 27; the screw is adapted to be received in a suitable supporting bracket for the mirror mount.

The frame flange-end 17 is provided with an end-filler panel 28 which defines with the flange-end 17 a slot 29 leading into the compartment formed by the backing 1 and frame 15. Panel 28 is like panel 20 and comprises a long side 30 and short sides 31, 32, 33, which conform in contour respectively to backing sides 3, 4 and 5. Panel 28 also comprises a plurality of integral upturned tabs as shown at 34 and these tabs resiliently engage interior surface portions of the backing to provide firm contact therebetween. Through the panel 28 there extends a screw 35 which is provided on its interior end with a retaining nut 36. This screw is adapted to be received into a suitable retaining bracket for the mirror mount.

Panel 28 is spot welded to the frame-backing assembly as indicated at 37; other spot welds of the backing to the frame are indicated at 37'.

Figure 1:
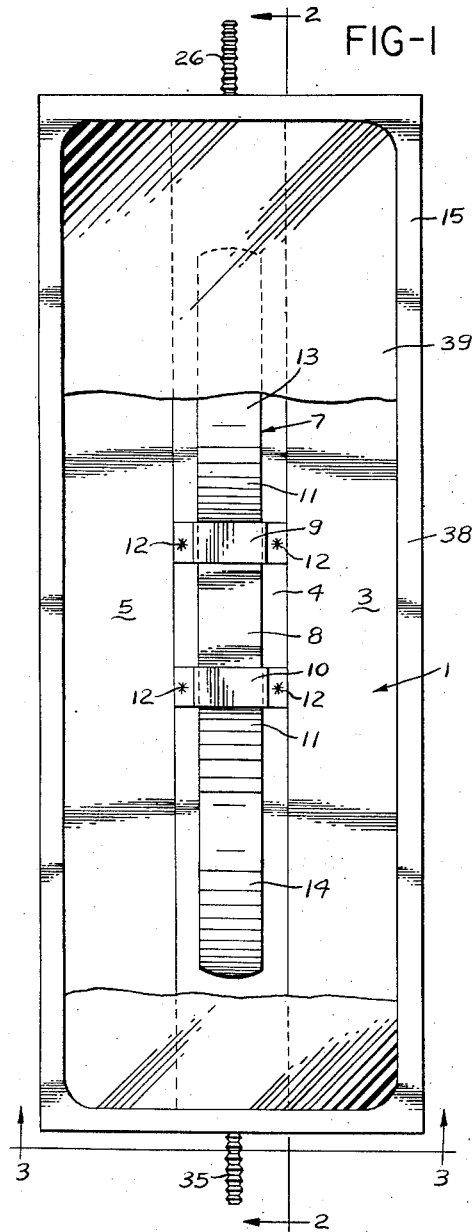
Figure 1 is an elevational view with portions broken away illustrating one embodiment of the structure of invention.
Figure 2:
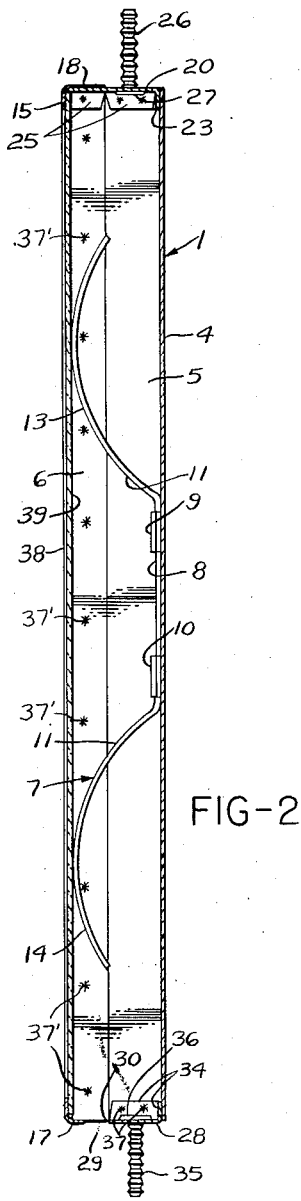
Figure 2 is a sectional view taken on line 2—2 of Figure 1.

The frame 15, at right angles to the flange 16, is provided with an inwardly extending mirror-retaining flange 38 which extends continuously around the inner side of the frame, thus providing an open-front compartment in the mounting. Mirror-glass 39 closes the open-front and is adapted to be slid through slot 29, longitudinally of the backing, over the band 8 to the position indicated in Figure 1. Mirror-glass 39 when inserted is biased by the spring arms 13, 14 of the resilient support 7 toward the frame 15 and is retained by the inwardly extending flange 38 and the flange-end 17.

Most suitably the peripheral edge of the mirror glass is provided with a gasket material 40 extending therearound and which is constituted of a tape for example. This gasket material does not in any way inhibit the sliding of the mirror-glass through slot 29.

To remove the mirror-glass from the mirror mounting it is merely necessary to apply a light pressure to the mirror-glass adjacent the spring arm near slot 29 and to depress the end of the glass below the flange-end 17 while sliding the mirror-glass longitudinally through the slot.

It is to be noted that for convenience in mounting the mirror-retaining frame 15 is most suitably provided with corner slits as at 41 to assist in mounting the frame onto the backing.

A further embodiment of an end panel is illustrated in Figure 8; the panel itself is designated by the numeral 42 and is like the panel of Figure 5 but is also provided with lugs 43, 44 struck up from the panel body. These lugs provide for a continuous air-opening through the mounting and are formed angularly to the longitudinal axis of the mounting; also the lugs protect the openings in the panel from the air-stream in usage on a truck, for example.

The slot 29 of the structure described not only provides for the insertion of the mirror-glass but in conjunction with the recessed or hollow compartment the slot adapts the mirror so as to inhibit development of fog, etc. on the face of the mirror-glass under conditions of exposure to steam, etc. The fogging is inhibited because the temperature conditions within the compartment are substantially the same as outside.

The backing and frame combine with the mirror-glass to form a unit which inhibits the entry of water but which provides for run-off of any vapor condensation.

The mirror-mount is economical to construct, compact and the structure does not contribute to unnecessary repair expense.

While the resilient band element is most suitably a wide band of heavy gauge metal and while this has been found most suitable for vehicle usage in particular circumstances, other materials may be employed, for example, plastics. Similarly the backing and frame forming the compartment are most suitably of sheet metal, but other materials may be substituted therefor.

The use of materials, such as sheet metal, which readily permit tab formation as at 25 and 34 in the drawings is desirable as the resilient tabs insure of tight engagement of the mating parts.

It will be understood that this invention is susceptible to modification in order to adapt it to different usages and conditions and accordingly, it is desired to comprehend such modifications within this invention as may fall within the scope of the appended claims.

I claim:

1. A mirror mounting comprising, a trough-shaped elongated backing and a cooperating mirror-retaining frame forming with the backing an open-front compartment adapted to be closed by a mirror, said frame including a flange-end extending inwardly of the compartment toward the backing, said backing having retained thereon extending longitudinally thereof a resilient band having end means free of the backing and deflectible toward the backing, the compartment having a slot adjacent the said flange-end leading into the compartment, and the band end means being depressible from the frame toward the slot for movement of a mirror through the slot over the resilient means into the mirror-retaining frame.

2. A mirror mounting comprising a trough-shaped elongated backing and a cooperating mirror-retaining frame forming with the backing an open-front compartment adapted to be closed by a mirror, said compartment being closed at one end thereof and said frame including a flange-end extending inwardly of the compartment toward the backing at the other end of the compartment, said backing having retained thereon extending longitudinally thereof a resilient band having end means free of the backing and deflectible toward the backing, the compartment having a slot adjacent the said flange-end leading into the compartment from the said other end thereof and the band end means being depressible from the frame toward the slot for movement of a mirror through the slot over the resilient means into the mirror-retaining frame.

3. A mirror mounting comprising, a trough-shaped elongated backing and a cooperating mirror-retaining frame forming with the backing an open-front compartment adapted to be closed by a mirror, said frame including a flange-end extending inwardly of the compartment toward the backing, said backing having retained thereon extending longitudinally thereof a resilient band having end means free of the backing and deflectible toward the backing, the compartment having a slot adjacent the said flange-end leading into the compartment, and the band end means being depressible from the frame toward the slot for movement of a mirror through the slot over the resilient means into the mirror-retaining frame, the other end of the said compartment having a closure, and the closure being provided with at least one opening leading into the compartment.

4. A mirror mounting comprising, a trough-shaped elongated backing and a cooperating mirror-retaining frame forming with the backing an open-front compartment adapted to be closed by a mirror, said compartment having a slot through one end thereof leading thereinto, the frame having flange means adjacent the one end extending interiorly of the compartment and adapted to have a mirror supported thereon, a mirror support secured to the backing for limited longitudinal movement with respect thereto and comprising a resilient band extending longitudinally with the backing and having opposed end spring arms adapted to receive and support a mirror and to urge a mirror thereon toward the flange means and the open front of the compartment, said band being depressible and limitedly movable longitudinally for the reception thereon through said slot of a mirror.

5. In a rear view mirror structure for motor vehicles, the combination of a mirror, a frame and a trough-shaped cooperating backing forming an open-front compartment retaining the mirror against movement laterally, forwardly and endwise of the frame, said frame including a flange-end extending inwardly of the compartment retaining the mirror against endwise movement in one direction and said compartment having a slot leading thereinto adjacent said flange-end through which slot said mirror is passable into said compartment, and a resilient band on the backing having ends thereof free of the backing, said band extending longitudinally of the backing toward but spaced from the ends of the backing and being depressible toward the backing by a mirror passed through the slot, the band biasing said mirror towards the open-front of the compartment.

References Cited in the file of this patent

UNITED STATES PATENTS

| 1,027,540 | Hendricks | May 28, 1912 |
| 2,585,273 | Prutzman | Feb. 12, 1952 |
| 2,686,456 | Szuba et al. | Aug. 17, 1954 |
| 2,722,160 | Prutzman | Nov. 1, 1955 |